Feb. 12, 1963     W. R. JENNINGS ETAL     3,077,014
MOLDING MACHINE AND PROCESS
Original Filed Nov. 24, 1954     4 Sheets-Sheet 2
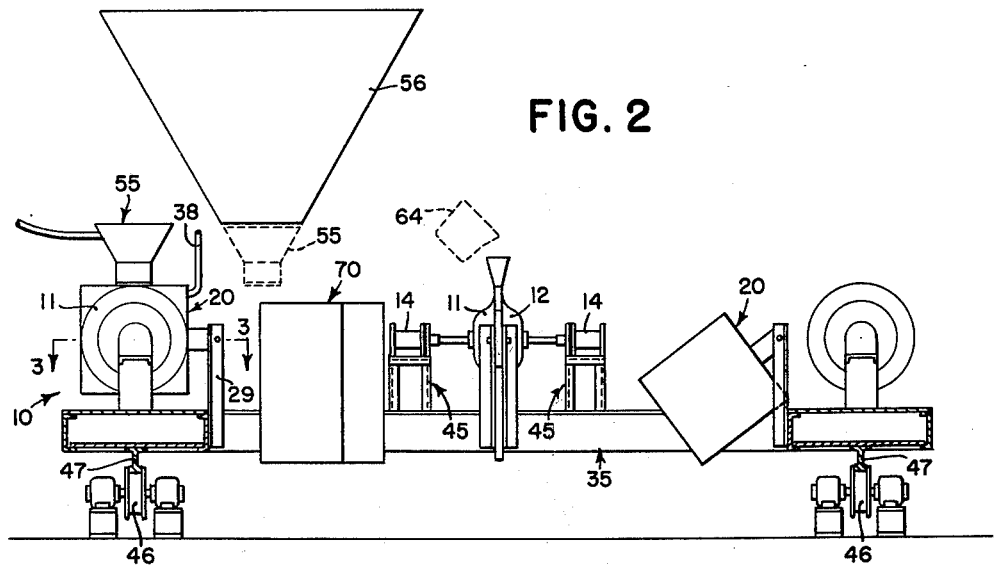
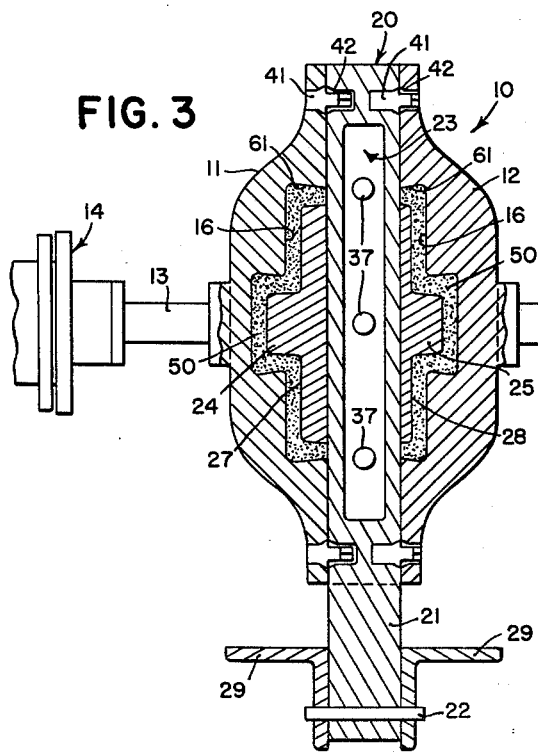
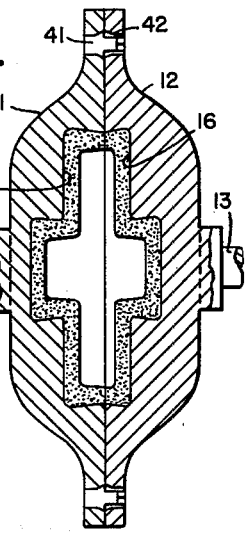
INVENTORS.
WILLIAM R. JENNINGS
RAYMOND V. GREDER
BY
ATTORNEYS Feb. 12, 1963   W. R. JENNINGS ETAL   3,077,014
MOLDING MACHINE AND PROCESS
Original Filed Nov. 24, 1954   4 Sheets-Sheet 3
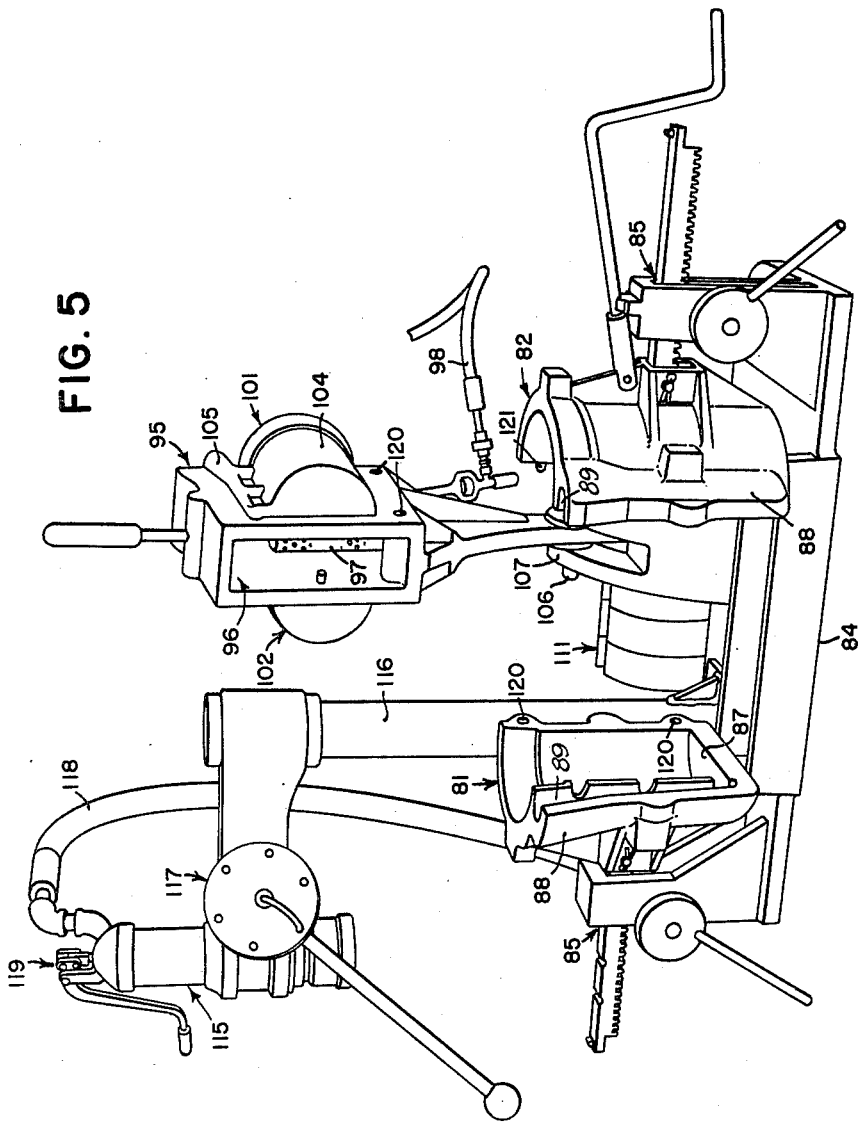
INVENTORS.
WILLIAM R. JENNINGS
RAYMOND V. GREDER
BY
C. T. Parker  R. C. Johnson
ATTORNEYS Feb. 12, 1963   W. R. JENNINGS ETAL   3,077,014
MOLDING MACHINE AND PROCESS
Original Filed Nov. 24, 1954   4 Sheets-Sheet 4

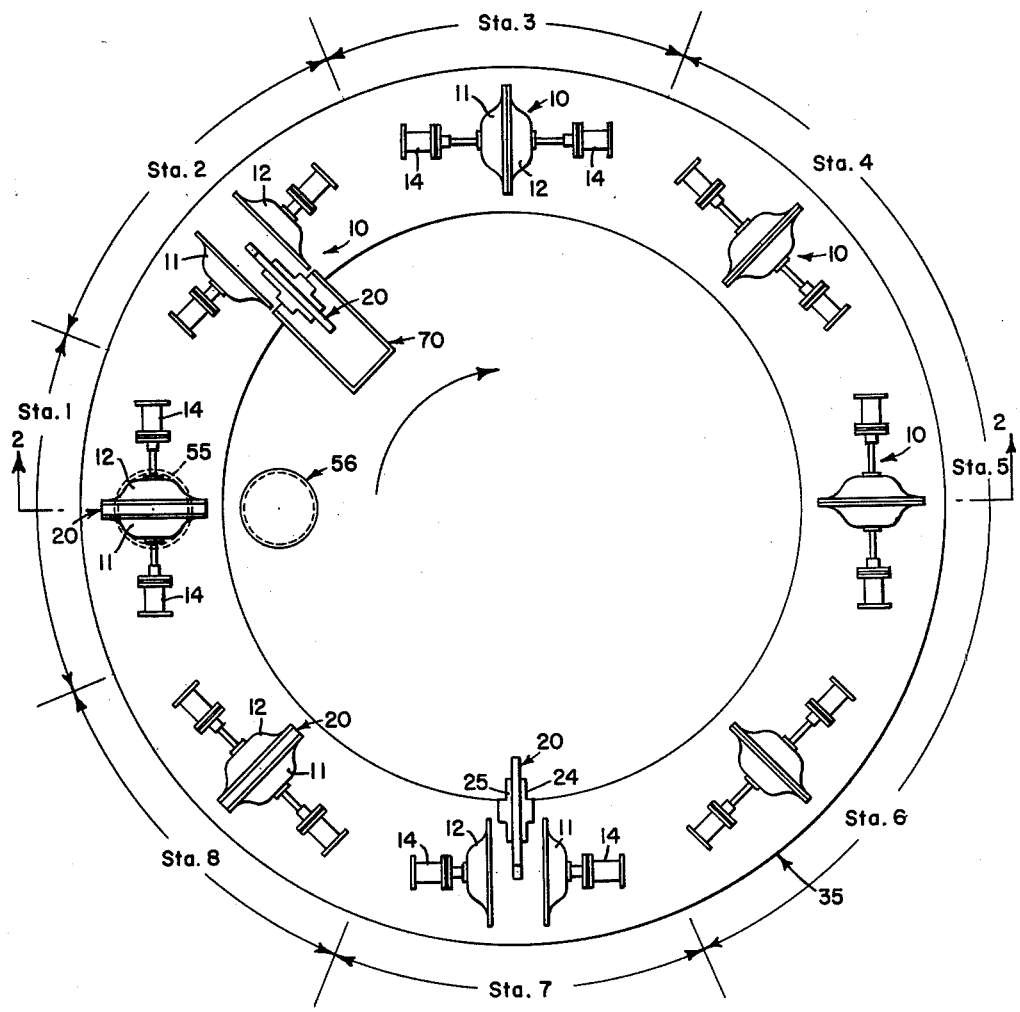
FIG. I
INVENTORS.
WILLIAM R. JENNINGS
RAYMOND V. GREDER
ATTORNEYS

INVENTORS.
WILLIAM R. JENNINGS
RAYMOND V. GREDER
BY
ATTORNEYS

United States Patent Office 3,077,014
Patented Feb. 12, 1963

3,077,014
MOLDING MACHINE AND PROCESS
William R. Jennings, Waterloo, Iowa, and Raymond V. Greder, Rock Island, Ill., assignors, by mesne assignments, to Deere & Company, a corporation of Delaware
Continuation of application Ser. No. 471,024, Nov. 24, 1954. This application Oct. 25, 1960, Ser. No. 64,838
8 Claims. (Cl. 22—20)

This is a continuation of our copending application, Ser. No. 471,024, filed November 24, 1954, now abandoned.

The present invention relates generally to casting processes and apparatus and more particularly to processes and apparatus utilizing shell molds.

The object and general nature of the present invention is the provision of new and improved methods and apparatus for producing metal castings with greater accuracy, smoother surfaces and at lower cost than is possible with prior methods and apparatus. More specifically, it is an important feature of this invention to provide a new and improved process and apparatus for shell molding by virtue of which metal castings can be produced utilizing resin-sand mixtures of materially less proportion of resins than heretofore possible. A further feature of this invention is the production of shell molds by blowing sand-resin mixtures directly into the backing members and the employment of the backing members during the pouring or casting operation, without ever removing the mold shells, as such, from the backing members.

A further feature of this invention is the method and apparatus that makes use of the step of forming shell molds directly in the two parts of a split mold apparatus and curing the shell molds and retaining them within the mold parts during the pouring or casting operation, and a further feature of this invention is the provision of a method and means for burning out the resin in the shell molds, by utilizing the heat of the molten metal, and then blowing out or otherwise removing all the remaining sand, or practically all of it, whereby the mold members are thus immediately conditioned without further heating to receive the next charge of the sand-resin mixture from which the next shell mold is formed.

Another important feature of the present invention is the provision of a means and method of utilizing shell molding without requiring the use of separate backing members or material to hold the mold halves together during the pouring or casting operation.

Still further, another feature of this invention is the provision of a means and method for utilizing shell molds without requiring any stripping or separate handling of the shell molds, whereby the thickness or weight of the shell molds, and the resin content thereof, may be substantially reduced.

Still further, an additional feature of this invention is the provision of means and apparatus for blowing both halves of a mold cavity at the same time and retaining said halves in the mold or backing members of a permanent mold apparatus, whereby, with the mold or backing members held in clamped position, the molten metal may be poured into the mold cavity without requiring any stripping of the mold shells from the backing members.

These and other objects and advantages of the present invention will be apparent to those skilled in the art after the following description of a preferred structural embodiment of the principles of the present invention, with the preferred method by which the principles are carried out, taken in conjunction with the accompanying drawings, in which:

FIG. 1 is a plan view of an apparatus by which the method of the present invention may be carried out in a continuous and automatic operation.

FIG. 2 is a side view of the apparatus shown in FIG. 1.

FIG. 3 is a cross-sectional view of one of the molding units during the shell blowing and/or curing operation.

FIG. 4 is a view similar to FIG. 3, showing the pattern plate removed and the mold members closed, ready for the pouring operation.

FIG. 5 is a perspective view of a slightly different form of apparatus by which the means and method of the present invention may be carried out, the apparatus being primarily employed when making a limited number of castings such that continuous and/or automatic action is not necessarily required, the parts of the apparatus being shown in the positions they occupy just after the release and removal of the casting previously formed.

Figure 6:
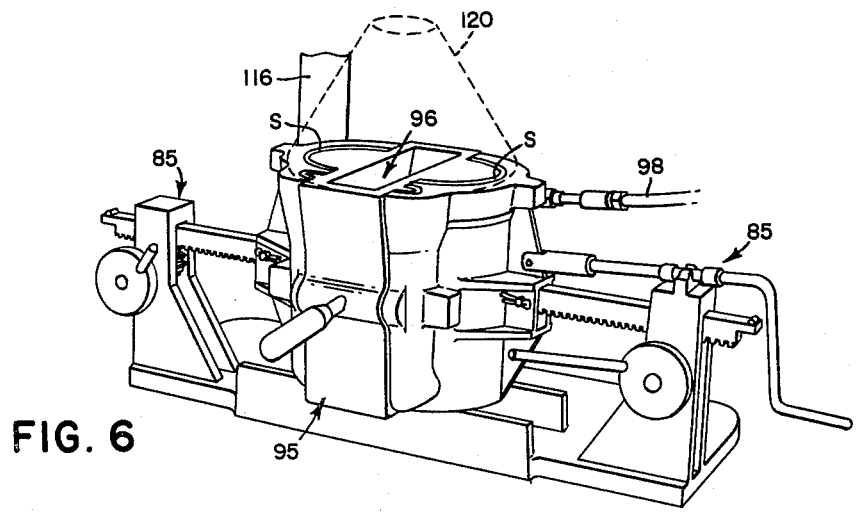

FIG. 6 is a view of the parts of FIG. 5, shown in the position in which the pattern is clamped between the two outer backing members or mold members, the means for blowing the resin-sand mixture into the spaces between the pattern and the outer mold members being shown in dotted lines in the position for blowing.

Figure 7:
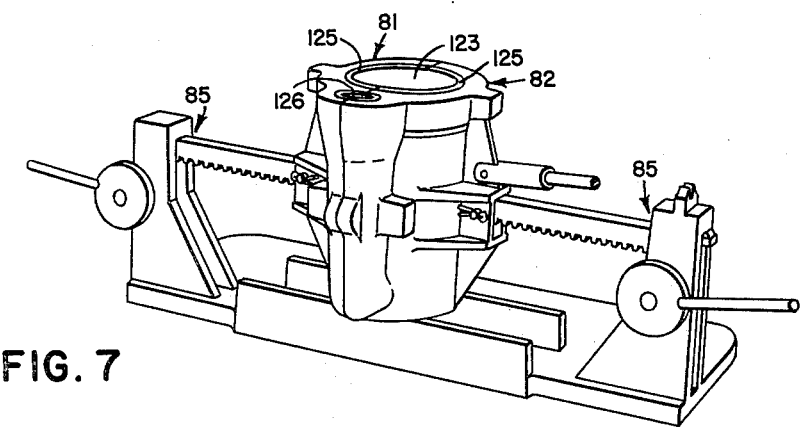

FIG. 7 shows the parts in the positions they occupy when the backing members have been closed and clamped, with the mold shells therein, ready for the pouring operation.

Referring first to FIG. 3, a cross section of one of the molding units 10 of the present invention is shown in this figure, in which two complementary mold members 11 and 12 are arranged in opposed relation and each is mounted on the piston 13 of an air cylinder 14 whereby admission of air into one end or the other of the cylinder 14 serves to shift the mold members 11 and 12 toward or away from one another. Each of the mold members, which is in the form of a permanent mold, serves as a backing member for an associated shell mold, as will be explained later in detail, and to this end, each of the mold members 11 and 12 is provided with an internal cavity 16 of predetermined shape depending, at least partially, upon the shape of the casting it is desired to produce. A pattern plate 20 is pivotally mounted, as by means of an extension 21 that is swingably mounted on a hinge pin 22. The pattern plate 20 preferably is hollow, as shown at 23, and carries suitable patterns 24 and 25 on its outer face. As illustrated in FIG. 3, the patterns 24 and 25 are similar and have outer surfaces 27 and 28 that are of the same general configuration as the inside surfaces 16 and 17 of the mold members 11 and 12. The hinge pin 22 is supported by a pair of angles 29 that are carried in any suitable way, as upon a turntable 35 that forms a part of the automatic molding machine, indicated generally in FIGS. 1 and 2.

The pattern plate 20, which may support different kinds and shapes of patterns 24 and 25, as desired, carries heating means of any suitable character, such as gas burners 37, to which combustible gas may be conducted in any suitable way, as by a flexible hose or conduit 38 (FIG. 2). The pattern plate 20, and also the mold members 11 and 12, carries any suitable number of alining pins 41 and associated bushings 42 as desired or necessary to insure proper alinement between the mold members 11 and 12 and the pattern plate 20. While we have shown only one pattern on each side of the plate 20, the latter serving principally as a support for such patterns, it will be understood that the plate 20 may, if desired, be in the nature of a match plate, carrying a number of pattern units, as desired.

As indicated in FIGS. 1 and 2, the turntable 35 may carry any suitable number of units 10, as indicated more or less diagrammatically in FIGS. 1 and 2. In these figures, the air cylinders 14 are shown as supported on suitable frames 45 carried by the turntable 35. The turntable 35 is itself supported by suitable rollers 46, preferably flanged, that cooperate with arcuate rail means 47 fixed to the underside of the turntable structure 35.

Referring again to FIG. 3, it will be noted that there is a space 50 between the interior surfaces 16 of the mold members 11 and 12 and the adjacent pattern surfaces 27 and 28. According to the principles of the present invention, after the parts are disposed and clamped, as by continuously exerted pressure by the air cylinders 14, a resin-sand mixture is, through suitable openings in either the pattern plate, the mold members 11 and 12, or both, blown into the spaces 50 as by air under pressure. Sand-blowing apparatus of this kind is conventional, and is indicated diagrammatically by the reference numeral 55 in FIG. 2. The resin-sand mixture employed in the process of the present invention is held in a stationary hopper 56, and the sand blower is mounted for movement, by means not shown, between a position over the unit 10 at the blowing station and a position under the hopper whereby the blowing unit 55 receives its resin-sand mixture.

The operation of and the method carried out by the apparatus as so far described are substantially as follows:

The turntable 35, FIGS. 1 and 2, supports eight units 10, and it may be considered, therefore, that the apparatus of FIGS. 1 and 2 employs, by way of example, eight stations. Station No. 1 is the blowing station, the parts being arranged as shown in FIG. 3. At this station the cavities between the mold members 11 and 12 and the associated pattern surfaces 27 and 28 are filled with a resin-sand mixture of suitable proportions. It will be noted from FIG. 3 that the peripheral walls of the mold cavities 16 are undercut, thereby providing reverse draft, as indicated at 61. In some cases, as, for example, where complete automatic mechanism may not be required, the pattern and backing member, with the sand-resin mixture included therebetween, may be cured in a suitable oven, but in an automatic or continuous operation, as indicated in FIG. 1, as soon as the resin-sand mixture is blown into the mold cavities, the heat of the pattern plate, and the patterns fixed thereto, and the residual heat remaining in the mold members 11 and 12 from the heat of the previous casting, begin to act at once to cure the resin-sand mixture, by which is meant the sand in the mold cavities is bonded to form a mold shell that reproduces with great fidelity the pattern surfaces.

By virtue of the reverse draft 61, the mold shells are retained in the members 11 and 12 so that when the mold unit 10 moves from station No. 1 to station No. 2 the shell has set up. Whereupon at station No. 2 the air cylinders 14 may be operated to separate the members 11 and 12, with the mold shells retained therein, from the pattern plate 20. The latter may then be swung away from the mold members, as indicated in FIG. 2, so that, at station No. 3, the air cylinders 14 can be operated to close the mold members, one against the other, the mold shells also being closed and clamped together by the action of the cylinders 14. The cavity formed by the closed shells may then be poured by any suitable means from any suitable source of molten metal, indicated diagrammatically by the reference numeral 64 that, in FIG. 2, is shown as representing a ladle from which molten metal may flow into the mold cavity formed by the mold shells within the members 11 and 12. The positions of the parts of the unit 10 at the pouring station, No. 3, are shown in FIG. 4.

After the pouring has been completed at station No. 3, the unit 10 passes through stations 4, 5, 6 and 7, which may be considered as a cooling period, the air cylinders 14 retaining the mold members 11 and 12 in firmly clamped position. By the time the unit 10 reaches station 7, the casting has cooled to a point sufficient to retain its shape, whereupon the mold members 11 and 12 may be separated by causing air pressure in each cylinder 14 to retract the pistons 13. By the time the cooling has completed, the heat of the molten metal poured into the mold, as well as the heat in the pattern plate and mold members 11 and 12, is sufficient to burn out all the resin in the mold shell so that, at station 7, the remaining sand of the shell molds falls away from the mold members 11 and 12, aided, if necessary, by air pressure at this station, or any other suitable means, as desired. At this station, the completed casting is removed. The unit 10 then proceeds to station 8 at which point the pattern plate, with patterns 24 and 25 attached thereto, is reinserted in between the mold members 11 and 12 and the mold closed by application of air pressure to the cylinders 14. As the unit 10 moves from station 8 back to station 1 to repeat the cycle, heat is applied, as through the burners 37, to the interior of the pattern plate so as to have the latter and associated parts at the proper temperature so that when the resin-sand mixture is blown into the spaces 50, the resin-sand mixture sets up promptly. If necessary, mold members 11 and 12 may be cooled by any suitable means.

If desired, the burners 37 within the interior cavity of the pattern plate may be replaced by a suitable oven 70, one for each unit 10, and so arranged, as shown in FIG. 2, to receive the pattern plate and heat the same when the pattern is swung away from the mold members 11 and 12 at station 2.

Referring now to FIGS. 5 et seq., we have shown here another form of apparatus by which the method of the present invention may be carried out but which is of simpler construction insofar as automatic continuous production is not necessarily contemplated. In FIG. 5, we have shown an apparatus for producing cast iron pistons. This is, of course, by way of illustration only. The apparatus shown in FIGS. 5 et seq. includes a pair of mold halves 81 and 82 mounted for lateral movement toward and away from one another on a suitable support 84 by any suitable means, such as manually operated rack and pinion units 85. As shown, each of the mold members 81 and 82 is in the form of a half cylinder having bottom closing sections 87 and vertical extensions 88 having interior cavities 89 shaped to form, with associated pattern structure, suitable gating means.

The pattern support is indicated by the reference numeral 95 and is generally hollow, as at 96, to provide a space for receiving heating means, as in the form of one or more gas burners 97 to which gas is supplied by any suitable conduit 98. Fixed to each side of the pattern support 95 is a pair of pattern members 101 and 102, each of which includes a main semicylindrical section 104 and connected therewith a gate-forming extension 105. The pattern carrier 95 is swingably mounted on a pivot 106 carried by brackets 107 that form a part of the base structure 84 on which the members 81 and 82, and the associated clamping means 85, are supported. Counterbalancing means in the form of weights 111 are mounted on the pattern carrier 95.

A sand-blowing unit 115 is mounted for lateral swinging movement on the upper end of a standard 116 supported on the base structure 84. The unit 115 is also movable vertically by any suitable means, as a manually operated rack and pinion mechanism 117, and air under pressure is brought to the unit 115 through a hose 118 under the control of a valve 119. Guide pins 121 are carried on one of the mold members 81 and 82 and enter sockets 120 formed in the pattern carrier 95, and also in the other mold member when the molds are closed for the pouring operation, as will be described below.

Referring first to FIG. 5, in the operation of this form of the invention, the pattern carrier 95, with patterns 101 and 102 thereon, is swung downwardly into the position indicated in FIG. 6, and the mold members 81 and 82 are clamped thereabout, as shown in FIG. 6. A sand box 120 of suitable construction is placed over the upper ends of the mold members 81 and 82, as shown in dotted lines in FIG. 6, and then the sand-blowing unit 115 swung over into position and clamped against the upper end of the box 120. Air pressure is then applied and resin-sand mixture is then blown into the spaces S between the patterns 101, 102 and the mold members 81 and 82. The air pressure drives the sand into and compacts it in the spaces of the mold with the requisite density. The heat of the mold carrier and pattern, together with heat in the mold members 81 and 82, as the residual heat from a previous casting, or by external heat applied thereto in any suitable way, cures the resin-sand mixture and forms a hard shell within each of the mold members 81 and 82. In order to insure that the shells shall be retained within the members 81 and 82, the latter is provided with radial openings, or any other suitable reverse draft means. After the curing has been completed, usually a matter of seconds, the mold members 81 and 82 are separated from the pattern, and then the pattern carrier, with pattern attached thereto, is swung out of the way substantially back to the position shown in FIG. 5. Next the mold members 81 and 82 are forced together, as by operation of the clamping means 85, and the mold members 81 and 82, after being clamped together to retain the mold shells just formed and after any necessary core or cores 123 are inserted, are now ready for pouring, as shown in FIG. 7. The upper portions of the two mating mold shells are indicated in FIG. 7 by the reference numeral 125. The shells include the requisite gate, as indicated at 126. Molten metal is then run into the mold through the gate 126 and the mold members 81 and 82 are held clamped while the metal cools. The heat of the molten charge is such that when the metal has cooled sufficiently to be self-supporting the resin in the mold shells has been burned out so that when the mold members 81 and 82 are separated to provide for removal of the casting, the remaining sand falls away from the mold members, aided by an air blast from any convenient air hose, if necessary. The pattern carrier, with pattern attached, and which remains heated, as from the gas burner 97, is then brought down into position between the mold members 81 and 82, the latter closed about the patterns and the cycle repeated.

One of the principal advantages of the present invention is that, while all of the advantages of the so-called shell molding process are secured, such as smoothness of surface, accuracy of pattern reproduction, etc., the mold shells, as employed in the instant process and apparatus, are never stripped from the mold members in which they are formed and they are, therefore, not subject to damage from handling, storage or the like. Moreover, and this is a further important feature of this invention, the mold shells are formed and cured promptly, usually in a matter of a few seconds, when the sand-resin mixture is blown into the heated pattern and back-up members, and the resulting shells are rigidly and firmly supported by the mold members 81 and 82 at all times and therefore great accuracy is attained, an accuracy that is considerably greater than can be obtained where the mold shells are stripped, separately handled, and later reassembled for pouring, with consequent difficulties due to, for example, the use of back-up materials, with consequent shifting or yielding of the latter which may result in the shifting of one mold shell relative to the other. Furthermore, the size of and/or thickness of the mold shells may, according to the instant process, be materially reduced, as compared with that required where the shells are to be stripped and separately handled, and this later reassembled for pouring. Therefore, according to the present invention, a materially smaller amount of resin-sand mixture is required for any given casting. Further, and what is probably more important, since, according to the present invention, the mold shells are always supported in the backing or mold members 81 and 82, and never stripped therefrom, the amount of resin in the resin-sand mixture may also be materially reduced. For example, experience has shown that where, for ordinary shell-molding processes, a resin-sand mixture of approximately five percent resin is required, satisfactory castings can be made under the instant process by using sand-resin mixtures in which the resin amounts to less than one percent. This occurs, of course, since according to the instant method, the mold shells do not have to have the strength that would be required if they are to be stripped and separately handled and reassembled. Further advantages accrue from the use of smaller proportions of resin. In the first place, the amount of gases generated during the pouring and shell-curing operations is materially reduced, since the amount of resin is reduced. This, as a consequence, reduces the possibility of blow holes and, with the lesser amount or proportion of resin, the porosity of the shell is increased. Further, since a smaller amount of resin is used, the time for curing the shell is reduced. This is true because both the pattern members and the backing members are heated and therefore heat to set and cure the sand-resin mixture is applied by the two heated members directly to both sides of the shell, both sides being in direct and intimate contact with the two heated members. This reduces the curing time by substantially one half as compared with applying curing heat, as in an oven, to only one side of the shell. Additionally, since according to our process the amount of resin-coated sand is reduced appreciably below what has been previously considered necessary, an appreciable further reduction of curing time is effected, since the smaller the amount of resin-sand mixture, the less total heat required, and since the resin is thermosetting in nature the smaller the proportion of resin to sand, the less heat required to effect a cure. Still further, the heat of the molten charge during the casting or pouring operation is available to keep the mold members 81 and 82 hot, so that additional heating is usually not required to cure the next charge of the resin-sand mixture when it is blown into the space between the heated members, as indicated in FIGURE 6.

While we have shown and described above, the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A method of producing metal castings, that comprises providing a pair of complementary backing members, clamping a pattern therebetween, blowing a heat settable sand mixture into the space between said pattern and each backing member, applying heat to heat the backing members so as to cure said mixture and form a mold shell within each backing member, separating said backing members and the mold shells therein from the pattern, closing said backing members against one another, with the mold shells retained therein to form a mold cavity, pouring molten metal into the mold cavity between the mold shells to form a casting, and utilizing the heat in the molten metal to disintegrate the mold shells and reheat the backing members.

2. A method of producing metal castings that comprises providing a pair of complementary backing members, clamping a pattern therebetween, heating said pattern and backing members, blowing a sand-resin mixture into the space between said pattern and each backing member, utilizing the heat of said pattern and backing members to cure said sand-resin mixture and to form a mold shell within each backing member, separating said backing members and the mold shells therein from the pattern, removing said pattern from between said mold shells and said backing members, closing said backing members against one another, with the mold shells retained therein, to form a mold cavity, pouring molten metal into the mold cavity between the mold shells, and utilizing the heat of the molten metal to destroy the resin binder in the mold shells to facilitate discharge of the latter from the backing members and to restore sufficient heat to the backing members to form a mold shell within each backing member when the next charge of sand-resin mixture is blown into the space between the pattern and each backing member.

3. A molding machine comprising a pair of backing members movable toward and away from one another and each having a shell-receiving cavity therein, a pattern movable toward and away from a position between said backing members, means to hold said members against said pattern, means to deposit a shell forming mixture into the space between said pattern and said backing members, means to cure said mixture to form a shell in each member, and means to hold the backing members, with said shells therein, together after the pattern has been removed.

4. A molding machine comprising a support, a two part flask including a pair of relatively movable mold members movable toward and away from one another and having mating marginal portions, a pattern support removably disposable between said members and having marginal portions shaped to mate with said marginal portions on said mold members, a pattern on each side of said pattern support and adapted to cooperate with the adjacent mold members to form therewith a shell-receiving cavity, means to deposit a hardenable shell-forming material in the cavities between said patterns and said members, means to heat said material to form self-supporting shells in said members, and means to close the latter, one against the other, when said patterns are removed from between said members, so as to form a mold to receive molten material to be cast.

5. A molding machine comprising means forming a pattern-receiving flask including a pair of parts movable toward and away from one another, a pattern removably disposable in said flask with a pattern surface on each side of said pattern, there being a space between each pattern surface and the adjacent face of the associated flask part, means to deposit a heat hardenable refractory in said spaces, means heating said flask to harden said refractory to form a shell in each of said flask parts, means connected with said flask parts to separate the latter so as to provide for the removal of said pattern, means connected with said pattern to remove the latter from between said flask parts and the associated shells, means to move said flask parts together to close said shells against one another, and means to deposit molten metal in the space between said shells.

6. Shell molding apparatus comprising a relatively stationary blowing machine carrying a charge of heat-hardenable material, a rotatable turntable mounted adjacent said blowing machine, a plurality of patterns carried in spaced apart relation by said turntable and movable therewith, means to continuously heat said patterns to shell-curing temperature, a backing member movable relative to said turntable into closed position relative to one of said patterns, means to heat said backing member to shell-curing temperature, said turntable being shiftable to carry said pattern and backing member in closed relation into a position with respect to said blowing machine to receive said charge of heat-hardenable material therefrom, and said turntable being movable to carry the filled pattern and backing member away from said blowing machine.

7. The invention set forth in claim 6, further characterized by means connected with the backing member to move the latter with cured shell therein away from the said one pattern while the latter remains carried by the turntable to be returned to the blowing machine.

8. Shell molding apparatus comprising a relatively stationary blowing machine carrying a charge of heat-hardenable material, conveyor means mounted adjacent said blowing machine, a plurality of patterns carried in spaced apart relation on said conveyor means and movable therewith, means to continuously heat said patterns to shell-curing temperature, a backing member movable relative to said conveyor means into closed position relative to each of said patterns, means to heat said backing members to shell-curing temperature, said conveyor means being shiftable to carry said patterns and backing members in closed relation successively into a position with respect to said blowing machine to receive said charge of heat-hardenable material therefrom, and said conveyor means being movable to carry each filled pattern and backing member away from said blowing machine.

References Cited in the file of this patent
UNITED STATES PATENTS

| | | |
|---|---|---|
| 2,445,141 | Hardy | July 13, 1948 |
| 2,720,687 | Shaw | Oct. 18, 1955 |
| 2,724,158 | Davis et al. | Nov. 22, 1955 |
| 2,791,012 | Miller | May 7, 1957 |
| 2,848,773 | Browne | Aug. 26, 1958 |
| 2,873,493 | Thomson et al. | Feb. 17, 1959 |